Oct. 21, 1930.  L. BENGE  1,778,789
MOLDED GEAR AND PULLEY
Filed Sept. 24, 1929  5 Sheets-Sheet 1

Inventor
LeRoy Benge
By W. B. Williamson
Atty.

Oct. 21, 1930.  L. BENGE  1,778,789
MOLDED GEAR AND PULLEY
Filed Sept. 24, 1929   5 Sheets-Sheet 2
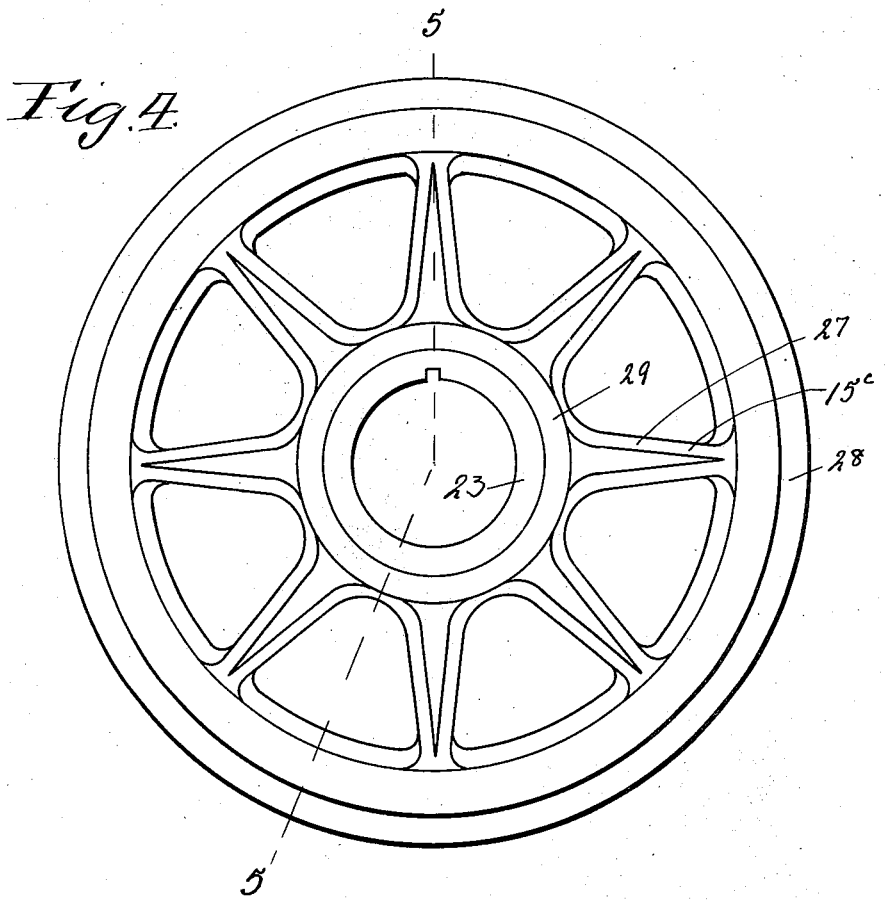
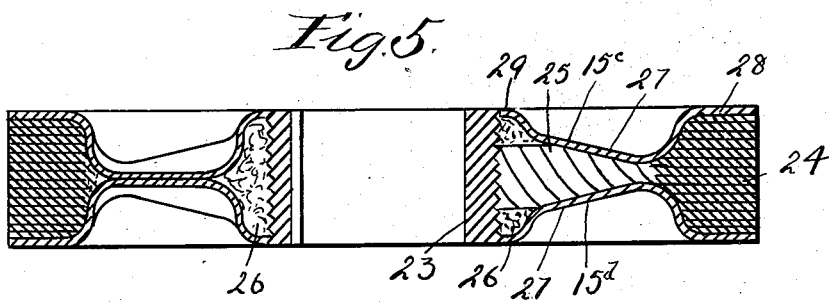
Inventor
LeRoy Benge
By W. B. Williamson
Atty Oct. 21, 1930.  L. BENGE  1,778,789
MOLDED GEAR AND PULLEY
Filed Sept. 24, 1929   5 Sheets-Sheet 3
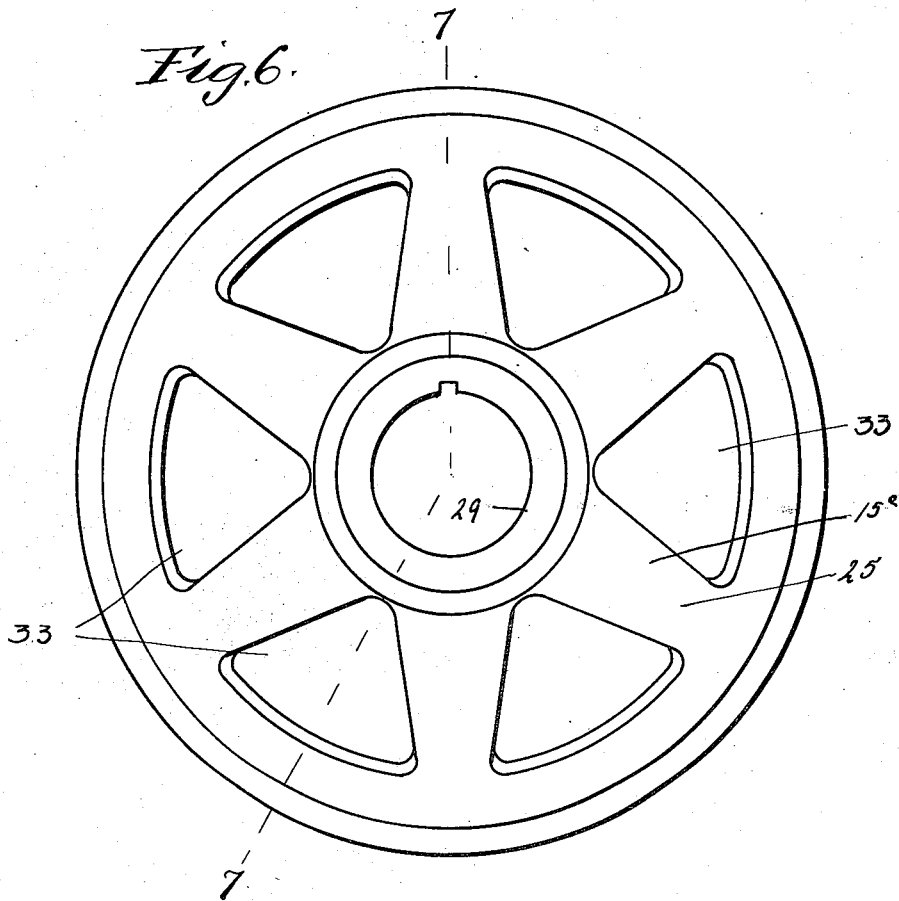
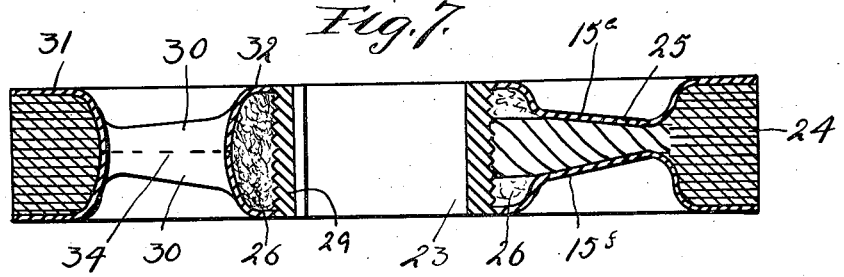
Inventor
LeRoy Benge
By W. W. Williamson
Atty.

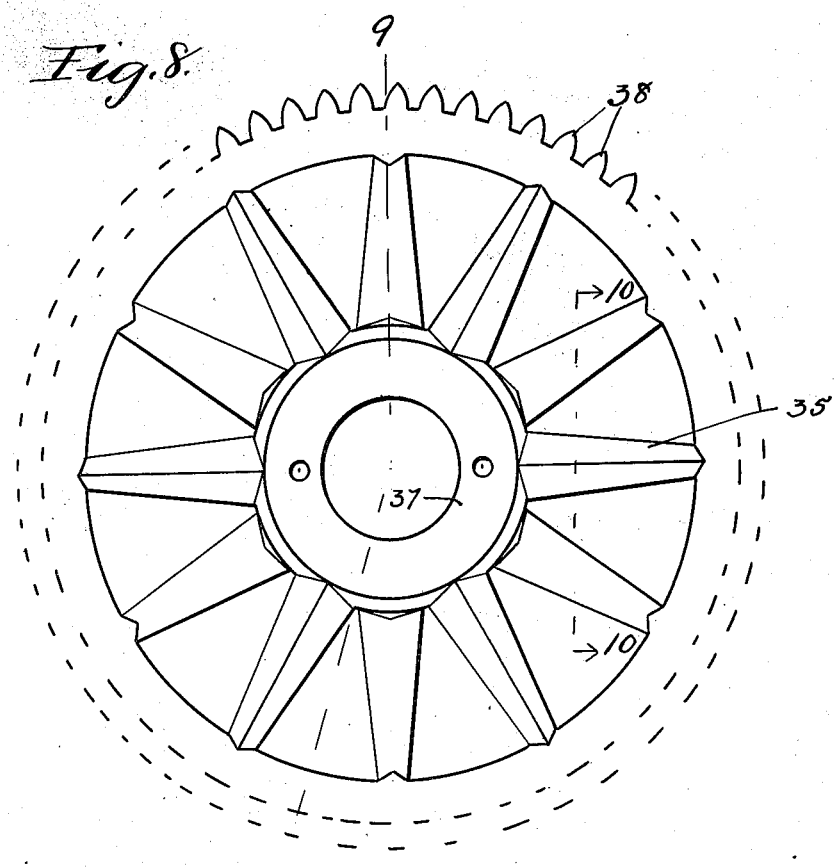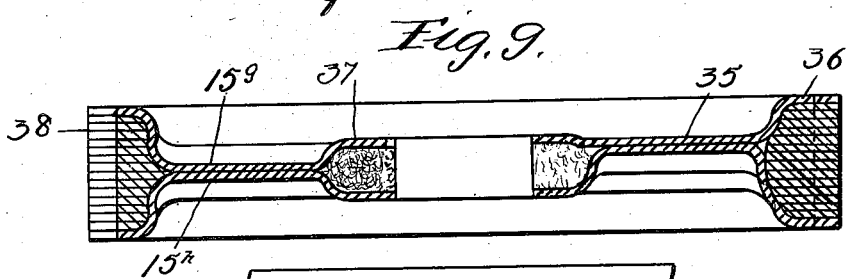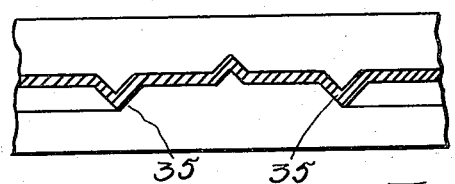

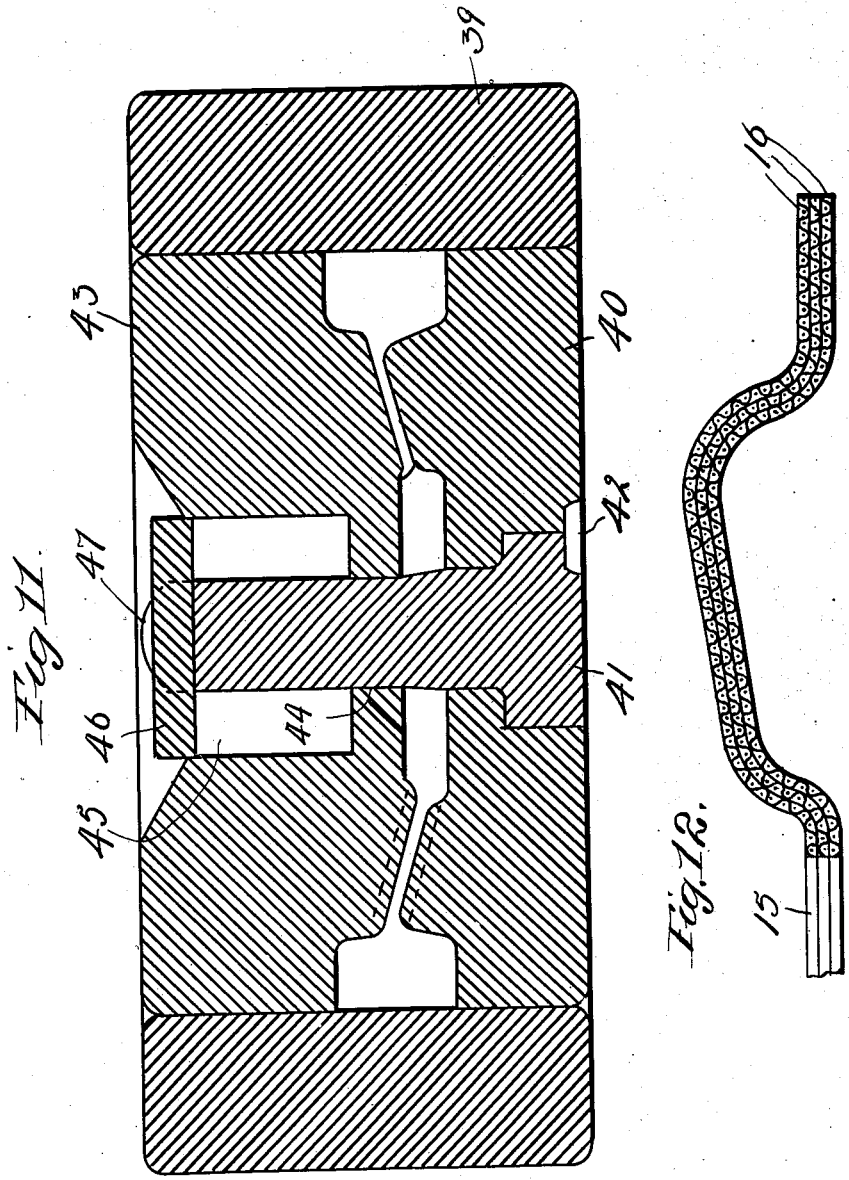

Patented Oct. 21, 1930

1,778,789

UNITED STATES PATENT OFFICE

LEROY BENGE, OF KENNETT SQUARE, PENNSYLVANIA

MOLDED GEAR AND PULLEY

Application filed September 24, 1929. Serial No. 394,760.

My invention relates to new and useful improvements in molded gears and pulleys and the method of producing the same, and has for one of its objects to improve the construction of such devices whereby a considerable saving in material will be gained, thus cheapening the cost of such devices.

Another object of the invention is to provide a new method of manufacturing devices of this kind wherein plates are produced by impregnating cotton duck or other fibre base material with phenol-formaldehyde resin product and then punching and preforming the plate to the desired shape.

A further object of the invention is to provide a new method of producing gears or pulleys of the kind mentioned which consists in using one or more preformed plates in spaced relation for the faces of the wheels and filling in the space at certain localities with strips, sheets or segments of cotton duck or other suitable similar material, quantities of cotton or other filler and cotton or other similar cord, all impregnated with the resin product and then pressing all the parts with the application of heat to produce a unitary homogeneous article.

Another object of the invention is to so construct a wheel of the kind herein mentioned which will have an exceedingly light web so fashioned as to be strong and durable with sufficient flexibility to take care of shock loads.

A further object of the invention is to provide a construction of molded gear or pulley wheel which will eliminate a large volume of tooth noise and rumble when in use. Theoretically, this is due to the relatively thin light corrugated web of spoke design which breaks up the "contact" between the rim and the hub.

A still further object of my invention is to provide molded gears and pulleys with corrugations, ribs or spokes which strengthen the structure without adding undue weight or material thereto, said ribs and spokes or the like acting as paddles when the wheels are used under certain conditions for distributing or agitating a lubricant or other fluid which fluid will help deaden the noise usually built up while running.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings forming a part of this application, in which:—

Fig. 4, is a face view of another form of wheel embodying my invention.

Fig. 5, is a section on the line 5—5 of Fig. 4.

Fig. 6, is a face view of another form of the invention.

Fig. 7, is a section on the line 7—7 of Fig. 6.

Fig. 8, is a face view of still another form of wheel showing the manner in which gear teeth may be cut into the rim.

Fig. 9, is a section on the line 9—9 of Fig. 8.

Fig. 10, is a section on the line 10—10 of Fig. 8.

Fig. 11, is a sectional view of a dye such as used for forming the wheel and the one shown would be used in connection with a form of wheel similar to that illustrated in Figs. 8 to 10 inclusive, but in which the hub would be off-set from the center of the rim.

Fig. 12, is an enlarged fragmentary sectional view of one of the preformed face plates, such as used in connection with the type of wheel illustrated in Fig. 5.

In carrying out my invention as herein embodied, 15 represents a face plate, Fig. 12, which is made up of any desirable number of layers 16 of cotton duck, other fibre base or material coated or impregnated with a synthetic resin, plastic or phenol-formaldehyde resin product which is preformed or fashioned to any desirable shape and punched to suitable formation or configuration to suit the requirements or shape of the wheel to be produced.

Figure 1:
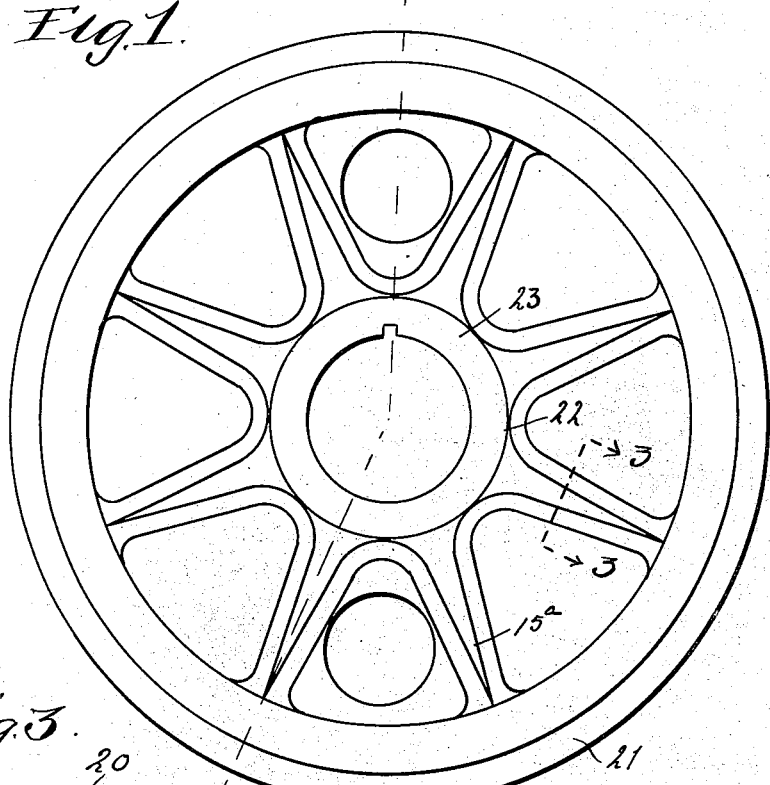
Fig. 1, is a face view of a wheel constructed in accordance with my invention, the same being shown complete as a pulley, but may be used as a gear by merely forming teeth on the rim.
Figure 3:
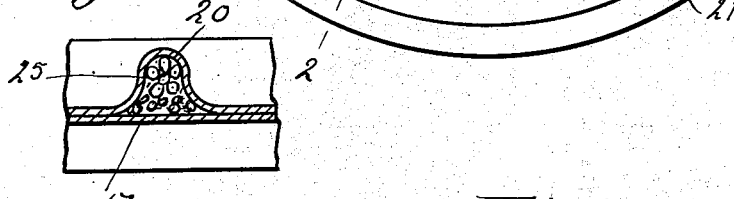
Fig. 3, is a fragmentary section through a portion of the web in the region of the line 3—3 of Fig. 1.
Figure 2:
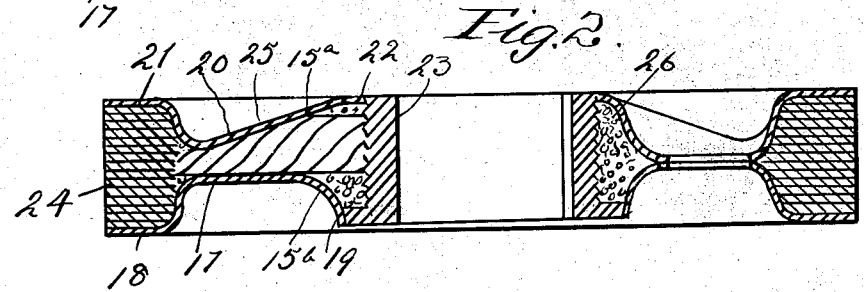
Fig. 2, is a section on the line 2—2 of Fig. 1.

The preformed face plates used in a single wheel may be slightly different from each other as shown in Figs. 1, 2 and 3, and as clearly illustrated in Figs. 2 and 3 and represented by the numerals 15$^a$ and 15$^b$, or they may be similar to each other, as shown in Figs. 4 and 5 and represented by the numerals 15$^c$ and 15$^d$, also as shown in Figs. 6 and 7 and represented by the numerals 15$^e$ and 15$^f$, as well as shown in Figs. 8, 9 and 10 and represented by the numerals 15$^g$ and 15$^h$.

In producing the preformed face plates, one or more layers of suitable cotton duck, other textile fabric, a suitable fibre base, or other material is impregnated with the synthetic resin plastic or phenol-formaldehyde resin product and after the sheet is properly dried, a blank of suitable shape is punched therefrom and placed in a preforming die maintained at a proper diameter and the face plate thus blanked out. Of course it will be understood that any order of the steps of forming the face plates may be used, as for instance, the material might be first punched to the desirable configuration or approximately the desirable configuration and then impregnated, pressed together, finally cut to the finished shape, and then preformed in the die.

As shown in Figs. 1, 2 and 3, the face plate 15$^b$ is preformed to provide a straight web portion 17 slightly off-set or inset from the rim 18 and the hub 19 and the companion face plate 15$^a$ has a plurality of radial corrugations 20 formed therein to represent spokes or ribs between the rim portion 21 and the hub portion 22.

To produce the wheel, a metal bushing 23 is first placed in position in a mold to form the hub and the exterior of this bushing is preferably roughened or corrugated as shown in Fig. 2 and next, one or more of the preformed face plates, as for instance 15$^a$ is positioned and then the laminated rim 24 is produced from a number of rings or segments of cotton duck or other suitable material impregnated or coated with the resin plastic or product which are placed one on top of the other with the rim resting on the rim portion 21 of the preformed face plate. After this, the rib material 25 of cotton cord or other built-up fibres or material impregnated or coated with the resin plastic or product is placed in the cavities formed by the corrugations 20 and then the spaces around the bushing in the region of the hub portion of the preformed plate is filled up with cotton filler or small pieces of fibre or other suitable material 26. After this has been done, one or more other preformed face plates, as 15$^b$, are laid on top of the above described make-up. By placing the mold with the make-up therein in a press with the use of a suitable pressure and heat, the resin plastic or product will cause all parts to adhere, thus producing a unitary homogeneous structure.

In Figs. 4 and 5, the preformed face plates 15$^c$ and 15$^d$ are similar in construction in all details and each of these has radial corrugations 27 formed between the rim portion 28 and the hub portion 29 and said corrugations decrease in depth toward the rim portion so that in the final formation of the wheel, said corrugations produce tapered ribs or spoke-like formations.

To produce a wheel such as shown in Figs. 4 and 5 the metal bushing 23, similar to the one before described, is placed in position in a mold to form the hub and then one or more of the preformed face plates, as 15$^d$ is positioned at the bottom of the mold and then a number of segments or rings of cotton duck or other similar material impregnated or coated with the resin plastic or product are placed on top of the rim portion of the preformed face plate 15$^d$ to form the laminated rim 24.

Next, the rib material 25 of cotton cord or other built-up fibres or material impregnated or coated with the resin plastic or product is placed in the corrugations 15$^d$ and then the spaces around the bushing and on top of the hub portion 29 of the preformed face plate 15$^d$ is filled up with filler or small pieces of fibre or other suitable material 26. After this, the other preformed face plate 15$^c$ is laid on top of the above described make-up and the parts pressed while under heat to produce a homogeneous mass in the shape of a wheel.

The structure shown in Figs. 4 and 5 has a web between the spoke structures, which web is produced from the two preformed face plates only.

In forming a wheel such as shown in Figs. 6 and 7 the preformed face plates 15$^e$ and 15$^f$ may also be of similar construction and comprise radial cupped spoke sections 30 between the rim portion 31 and the hub portion 32. The spoke sections are in spaced relation to each other so as to provide apertures 33 between them, and when two of the face plates join in the finished article, their edges meet approximately along the dotted line 34, Fig. 7.

In all other respects, a wheel of this configuration and design is produced in the same manner as the ones previously described, it being understood, of course, that the molds in each instance are different and are shaped to correspond to the configurations of the different wheels.

The structure illustrated in Figs. 8, 9 and 10 is similar to the structures previously described with the exception that the two preformed face plates are provided with radial corrugations 35 between the rim portion 36 and the hub portion 37. These corrugations are arranged so that the ones in one face plate correspond with those on the other face plate and when said face plates are brought together in the finished article produce ribs such as shown in Fig. 10 without any filler or material of any kind between the two plates. The rim and hub are formed in the same manner as described in connection with the other formations and therefore the same reference numeral will be used.

It will be noted that while all of the previously described wheels are shown as having plain smooth rims as in pulley wheels, and in Figs. 8 and 9 the wheel is shown as provided with gear teeth 38, any of the structures can be fashioned for use as a gear wheel or a pulley wheel.

A convenient mold for accomplishing the final step in the production of a wheel, such as above described, consists of a ring 39 in which is placed the base matrix 40 carrying a post 41 properly positioned by a key 42 and with the base matrix coacts the companion or plunger matrix 43 having a bore 44 for the reception of the post 41 and having vertical grooves 45 arranged directly opposite one another on opposite sides of the bore for the reception of the ends of a pin 46 mounted in a slot 47 in the upper or outer end of the post 41.

The plunger matrix 43 may be removed carrying the pin 46 with it and after the make-up has been placed in the mold so as to rest upon the base matrix. The plunger matrix may now be inserted in the mold ring 39 by shifting it until the pin 46 registers with the slot 47, said plunger matrix will be properly aligned and will then slide into place. When the mold is put in a press, when the plunger matrix is forced down, then the pin 46 will not interfere with the movement of said plunger matrix.

By providing deflections in the form of corrugations, ribs or spokes, considerable strength is added, permitting reduction in the amount of material used to withstand strains so that wheels will be light in weight and flexible although strong and durable and many of the disadvantages found in the devices of this kind will be overcome due to said light, strong flexible construction.

From the foregoing it will be obvious that I have produced a composition gear which is relatively light in weight although strong and durable and inexpensive in the cost of manufacture and which when in use is practically noiseless or at least the noise is reduced to such an extent that it is hardly perceptible to the human ear.

Of course I do not wish to be limited to the exact details of construction as herein shown, as these may be varied within the limits of the appended claims without departing from the spirit of my invention.

Having thus fully described my invention, what I claim as new and useful is:—

1. A molded non-metallic gear wheel consisting of an integral hub, spokes and rim produced from preformed elements impregnated with a binder and formed into a homogeneous mass through the use of heat and pressure.

2. A composition gear provided with teeth, said gear comprising a hub and rim connected by spokes.

3. A molded gear comprising spokes, rim and hub, each produced from fibrous material impregnated with phenol-formaldehyde resin product and preformed to the desired shape and all parts being formed into a homogeneous mass by the use of heat and pressure.

In testimony whereof, I have hereunto affixed my signature.

LEROY BENGE.